Dec. 10, 1963  A. G. KEPPLER  3,113,505
DISPOSABLE BROILING TRAY
Filed Sept. 5, 1961  2 Sheets-Sheet 1
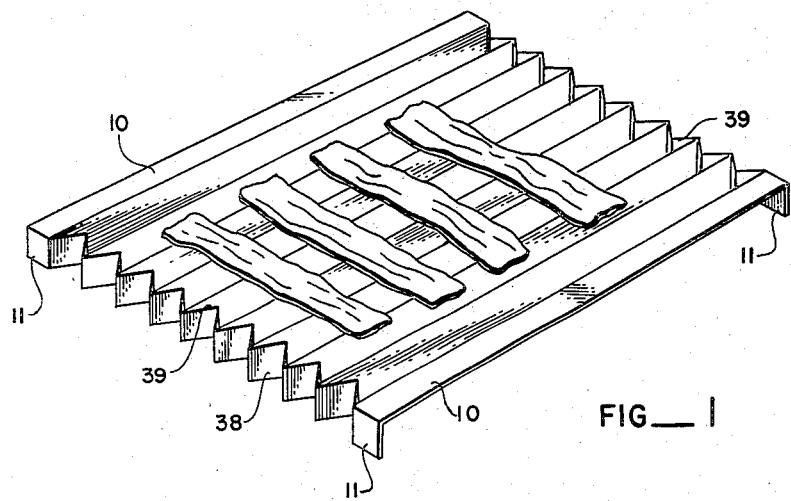
FIG—1
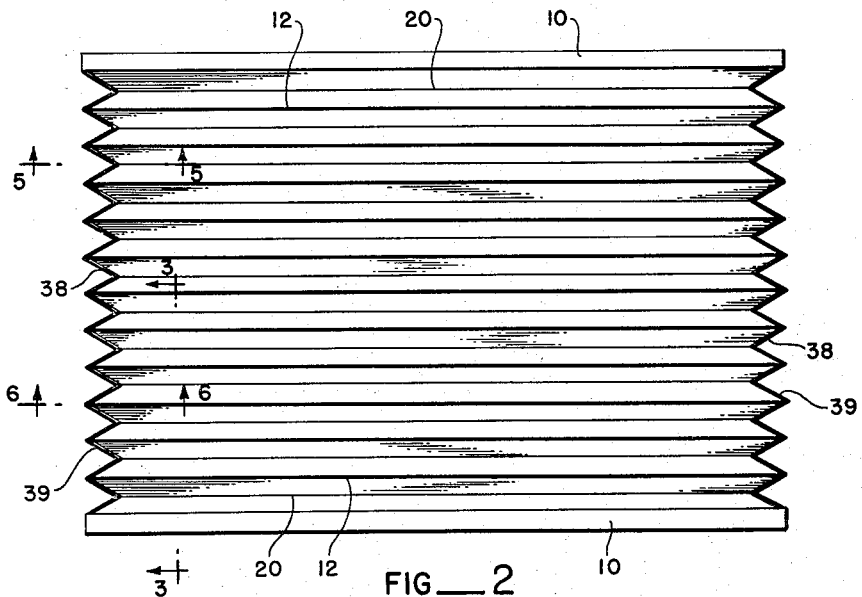
FIG—2
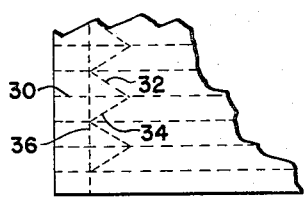
FIG—8
ARNOLD G. KEPPLER
INVENTOR.
BY
*Clarence M. Fuch*
ATTORNEY Dec. 10, 1963  A. G. KEPPLER  3,113,505
DISPOSABLE BROILING TRAY
Filed Sept. 5, 1961  2 Sheets-Sheet 2
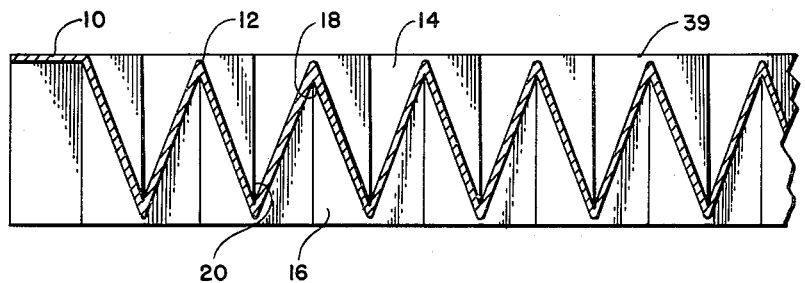
FIG_3
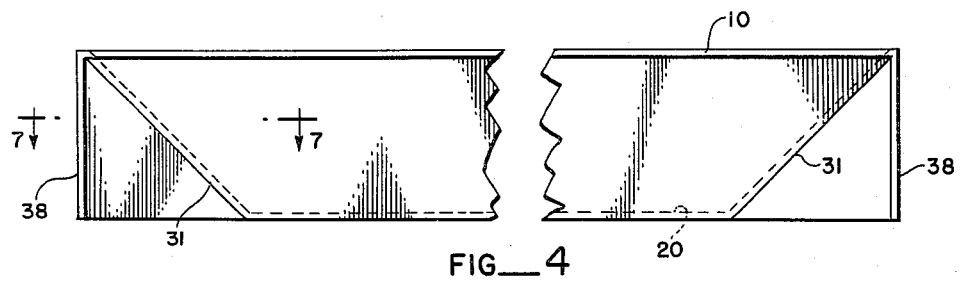
FIG_4
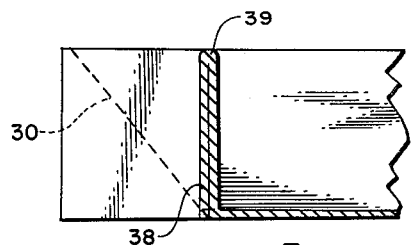
FIG_5
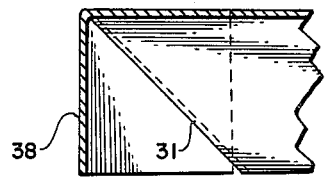
FIG_6
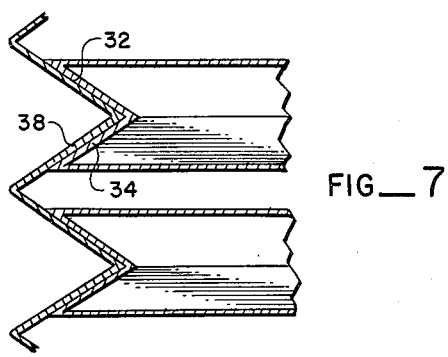
FIG_7
ARNOLD G. KEPPLER
INVENTOR.
BY Clarence M. Tuck
ATTORNEY

United States Patent Office 3,113,505
Patented Dec. 10, 1963

3,113,505
DISPOSABLE BROILING TRAY
Arnold G. Keppler, 2702 S. 194th St., Seattle 88, Wash.
Filed Sept. 5, 1961, Ser. No. 135,903
3 Claims. (Cl. 99—425)

This present invention relates to that general class of devices employed to keep ovens from being unduly encrusted with grease and the like, especially from broiling foods. More specifically, this invention relates to a corrugated tray that has enclosed ends and which is made of such lightweight aluminum that it can be used and disposed of along with all the grease that has been rendered from the foods being broiled.

Manufacturers of stoves and broiling equipment have recognized the insistent demand of the average housewife that the ovens employed for broiling should be of a type that can be cleaned with the minimum of effort after the broiling operation is completed. Endeavors to find ways to make the ovens readily cleanable have even gone so far as to involve having removable portions of the oven walls to assist in thorough cleaning. In this present invention, however, I have endeavored to get to the root of this difficulty and provide a disposable broiling tray so constructed that it will catch and distribute all the grease that may be rendered out of the food cooked throughout a large number of deep corrugations. This general arrangement greatly reduces the amount of grease on the oven walls which usually become incrusted with burned on grease. It is therefore believed that this present arrangement serves its purpose of eliminating a great deal of oven cleaning as well as entirely eliminating the necessity of washing greasy broiling pans which is one of the housewife's most unpleasant tasks.

Studies have indicated however that in order for a cooking sheet or tray to be truly disposable and within the price range that can be afforded by the average family, it is necessary that the tray be made of very light gauge sheet material. When an endeavor is made to press sheet material so that the ends of the corrugations or valleys are closed it has been found that the pressing operation requires a ductile material and one that can be stretched at the ends of the valleys. This is not too practical because the amount of stretching necessary is excessive and a ductile material must be stiffened in some manner or it will not hold its shape during periods of use, particularly during the heating and this is most important if the tray is to be removed with the grease fully contained within the valleys. In order to provide the required rigidity so that sheet aluminum of thicknesses of .0015" to .0025" may be used, the so-called cold working appears to be the only practical hardening method which insures that the stiffening is not lost under the normal heating conditions encountered during the broiling operation. The cold working of aluminum, as is true of many of the other non-ferrous metals, is normally best achieved by repeated rolling under pressure, which is the operation by which the thickness of the material can be greatly reduced with a resultant saving in cost.

My present invention is especially well adapted, not only for the general broiling of chops, steaks and bacon but for small fish such as trout and the wide variety of sea foods, whose odd sizes and shapes make them difficult to broil on the average broiling tray. My broiling tray, by suitable variation in the weight of material employed in its construction, can be readily adapted to the broiling of any foods normally broiled in the usual manner.

The principal object of my present invention therefore is to provide a disposable broiling tray formed of hardened lightweight aluminum which is sharply corrugated to provide relatively narrow and deep valleys, with the corresponding sharp ridges between them.

A further object of this invention is to provide a disposable broiling tray in which the ends of the valleys are closed preferably by folding the metal so that there will be no reduction in the thickness of the already very thin material.

A further object of this invention is to provide an end closure for the valleys of a corrugated broiling tray in which the material folded at the ends of the valleys is carried entirely across the ends and thus becomes a reinforcement at the very point where there is the greatest tendency for the valleys to spread. This arrangement thus provides a maximum rigidity of the tray so that it may be easily and safely handled even when the valleys are partially filled with hot grease.

A further object of this invention is to provide a disposable broiling tray having a plurality of tightly spaced corrugations which provide an adequate rest for any materials being broiled, and this is particularly true of the small bite-sized foods which in the usual widely spaced apart grills of the ordinary broiling pan are inclined to drop into the grease.

A further object of this invention is to provide a plurality of tightly spaced valleys in a corrugated surface so that the grease rendered from foods being cooked will be distributed substantailly over a large number of corrugations so that the depth of rendered fat will not be great in any one valley.

Further objects, advantages and capabilities will be apparent from the disclosure in the drawings or may be comprehended or are inherent in the device.

In the drawings:

FIGURE 1 is a perspective view showing the general manner in which my disposable broiling tray is employed.

FIGURE 2 is a top plan view of the broiling tray of FIGURE 1.

FIGURE 3 is a fragmentary cross-sectional view on an enlarged scale taken along the line 3—3 of FIGURE 2.

FIGURE 4 is a fragmentary broken view on an enlarged scale showing, in side elevation, the manner in which the valleys are closed at their ends.

FIGURE 5 is a fragmentary cross-sectional view on an enlarged scale, taken along the line 5—5 of FIGURE 2.

FIGURE 6 is a fragmentary view on an enlarged scale and taken along the line 6—6 of FIGURE 2.

FIGURE 7 is a fragmentary view taken along the line 7—7 of FIGURE 4 and on the same scale as that figure.

FIGURE 8 is a fragmentary view showing the lines along which the sheet metal is folded to produce my broiling tray.

Referring to the drawings, throughout which like reference characters indicate like parts, the numeral 10 designates marginal horizontal stiffening edges. These edges have a dual purpose, first, they provide against having a sharp upper and exposed edge on one of the valleys as a margin, and secondly, being disposed in a horizontal plane, they give an unusual stiffness when the light material of the tray is considered, which prevents the collapsing of the central portion of the valley and ridge corrugated arrangement. The ends of these marginal reinforcing edges having turned down end portions as indicated at 11 to provide feet which establishes the general level of the device and normally raises the level of the bottom above the plane of the bottom of feet 11.

Referring to FIGURE 3, a preferred proportioning of the corrugations is illustrated. Here, it will be noted that the height of the ridges 12 is appreciably greater than the width of the valleys 14 or the inverted valleys 16 under each of the longitudinal ridges 12. It is further to be noted that the apexes 18 of the ridges and the apexes of the valleys 20 are quite sharply folded to give sharply peaked peaks and valleys so as to give a fold that will be difficult to spread once it is made in material that has been work hardened. Experience with the use of this equipment indicates that the transverse spread of the ridges 12 is preferably kept within the range of ½ to ¾ inch, making it possible to broil small food pieces, especially seafood such as partial crab legs, shrimps, small prawns and scallops, whose flavor is greatly improved by broiling. The depth of the valleys is preferably about 50% greater than the width or spread of the valleys at their upper level. This serves a dual purpose in that an adequate space is provided for catching rendered-out grease and juices which will never reach a level where they may contact the underside of the foods being broiled and since certain of these juices may boil under the broiling heat tend to spatter over the lower surface of the food if they are not sufficiently elevated above the level of the retained juices. Secondly, when dealing with lightweight sheet aluminum, the sharp corrugations as indicated throughout my present drawings tend to give a marked degree of structural strength which is very desirable.

The forming of the end closure for the plurality of valleys 14 is preferably achieved by folding the material, which because of its very minimum thickness, does not lend itself to pressing, most especially after it has been work hardened. I therefore find it desirable to form these closures, as will be observed generally throughout the drawings by starting the folding with a creasing of the materials as indicated in FIGURE 8 in which median lines are scored and then the V determining median lines, 30 are scored. Then at the inner ends of these lines, V's are formed by the lines 32 and 34. The depth of these V's and median folds 31 along line 30 is appreciably greater than the depth of the valleys because it has been found desirable to bend the same downwardly along the line 36 so as to provide the vertical folded face portion 38 and the ridge 39, as shown in FIGURE 5. Normally, this formation will be achieved by suitable die equipment. However, in order to provide the folding desired it is usual for the dies to engage along the lines as indicated in FIGURE 8 and then to fold the material so as to give the effect shown particularly in FIGURE 7 in which the folded-over wall portion 38 and its relationship to the end V's having the triangular surfaces 32 and 34. This construction gives a double strength wall for a portion of the end of each valley and adds very materially to the strength of the entire structure and prevents the spreading of the valleys which would of course destroy the tray-like shape of this broiling means and defeat its purpose.

It is believed that it will be clearly apparant from the above description and the disclosure in the drawings that the invention comprehends a novel construction of a disposable broiling tray.

Having thus described my invention, I claim:

1. A disposable broiling tray comprising a single sheet of thin metal foil of uniform thickness, said single sheet having a plurality of longitudinal folds, alternate folds being oppositely folded to form peak folds and valley folds to thereby provide longitudinal corrugations defining alternating peaks and valleys, said sheet being further folded laterally adjacent the end margins thereof to provide downwardly folded end walls, one at each longitudinal end of said sheet, and said sheet being still further folded diagonally from the intersections of said peak folds with said lateral folds to a common point on said valley folds spaced inwardly of said sheet from said lateral folds, said diagonal folds providing upwardly extending end walls obstructing said valleys and said downwardly folded end walls being folded against said upwardly extending end walls with said downwardly extending end walls lying in a vertical plane to thereby provide reinforced end closures for said valleys which add materially to the strength of the structure.

2. A disposable broiling tray comprising a single sheet of thin metal foil of uniform thickness, said single sheet having a plurality of longitudinal folds, alternate folds being oppositely folded to form peak folds and valley folds to thereby provide longitudinal corrugations defining alternating peaks and valleys terminating in terminal peaks, said sheet being further folded laterally adjacent the end margins thereof to provide downwardly folded end walls, one at each longitudinal end of said sheet, and said sheet being still further folded diagonally from the intersections of said peak folds with said lateral folds to a common point on said valley folds spaced inwardly of said sheet from said lateral folds, said diagonal folds providing upwardly extending end walls obstructing said valleys and said downwardly folded end walls being folded against said upwardly extending end walls with said downwardly extending end walls lying in a vertical plane to thereby provide reinforced end closures for said valleys which add materially to the strength of the structure, and said sheet still further including horizontal marginal ledges extending outwardly from said terminal peaks.

3. A disposable broiling tray as recited in claim 2 in which said marginal ledges and said downwardly folded end walls terminate in common downwardly folded feet positioned at the corners of said tray.

References Cited in the file of this patent
UNITED STATES PATENTS

| | | |
|---|---|---|
| D. 187,304 | Hopper | Feb. 23, 1960 |
| 124,296 | Smith | Mar. 5, 1872 |
| 389,602 | Sankey | Sept. 18, 1888 |
| 1,170,776 | Nagle | Feb. 8, 1916 |
| 1,206,717 | Kochling | Nov. 28, 1916 |
| 1,301,197 | Tully | Apr. 22, 1919 |
| 2,370,595 | Volks | Feb. 27, 1945 |
| 2,918,379 | Lurie | Dec. 22, 1957 |